United States Patent [19]
DeJonge

[11] Patent Number: 5,636,765
[45] Date of Patent: Jun. 10, 1997

[54] METERED DISPENSING CAP WITH MANIFOLD COVER

[75] Inventor: Stuart DeJonge, Williams Township, North Hampton County, Pa.

[73] Assignee: Primary Delivery Systems, Inc., Easton, Pa.

[21] Appl. No.: 489,300

[22] Filed: Jun. 9, 1995

[51] Int. Cl.⁶ ............................................. B67D 5/42
[52] U.S. Cl. .................. 222/107; 222/207; 222/212; 222/215; 222/321.1; 222/321.6; 222/321.7
[58] Field of Search ............................. 222/95, 107, 207, 222/212, 215, 309, 321.1, 321.6, 321.7, 378, 380, 383.1

[56] References Cited

U.S. PATENT DOCUMENTS

| | | | |
|---|---|---|---|
| 1,926,367 | 9/1933 | Booth | 222/320 |
| 2,205,082 | 6/1940 | Callaghan et al. | 222/320 |
| 2,591,455 | 4/1952 | Marshall | 222/205 |
| 3,089,623 | 5/1963 | Padzieski | 222/205 |
| 3,319,836 | 5/1967 | Cubitt | 222/207 |
| 3,828,985 | 8/1974 | Schindler | 222/207 |
| 4,077,547 | 3/1978 | Donoghue | 222/207 |
| 4,364,492 | 12/1982 | Kong | 222/207 |
| 4,376,495 | 3/1983 | Spatz | 222/207 X |
| 4,518,105 | 5/1985 | Kuckens et al. | 222/207 |
| 4,875,603 | 10/1989 | Weinstein | 222/207 X |
| 4,946,076 | 8/1990 | Hackmann et al. | 222/207 |
| 5,184,760 | 2/1993 | Weinstein et al. | 222/207 |
| 5,197,637 | 3/1993 | Naumann | 222/207 |

FOREIGN PATENT DOCUMENTS

| | | | |
|---|---|---|---|
| 0312474 | 4/1989 | European Pat. Off. | 222/207 |
| 2671330 | 7/1992 | France | 222/207 |

*Primary Examiner*—Andres Kashnikow
*Assistant Examiner*—Kenneth Bomberg
*Attorney, Agent, or Firm*—Kenneth P. Glynn

[57] ABSTRACT

The present invention is directed to a metered dispensing cap with manifold cover for containers such as tubes and the like. The metered dispensing cap with manifold cover has a base element, a meter element housing a one-way valve, a manifold cover and a open-close valve for permitting flow of material from a meter chamber to a manifold chamber and out through the manifold cover. The present invention provides for an even, metered dispensing of material through the manifold cover.

18 Claims, 2 Drawing Sheets

METERED DISPENSING CAP WITH MANIFOLD COVER

BACKGROUND OF THE INVENTION

1. Field of the Invention

The present invention relates to an easy-to-use metered dispensing cap with manifold cover for tubes and other types of containers. In particular, this invention is directed to a cap system which permits metered amounts of material to be repeatedly dispensed as desired. By squeezing the container, a meter chamber is filled as the container is pushed upward; by pressing downward on a manifold cover, the material is dispensed through the meter chamber and out through the manifold cover.

2. Information Disclosure Statement

Numerous patents describe various types of dispensing caps and the industry is inundated with various designs which are sometimes complicated in operation and/or complex to manufacture. The art goes back decades, and the following patents describe different types of dispensing caps and systems that are exemplary:

Early United States patents were directed to metering systems involving designs which typically utilize the full length of a cylindrical chamber to create a volume for the dispensing of a liquid or a semi-liquid material. U.S. Pat. Nos. 1,926,367 and 2,205,082 illustrate these types of early dispensing containers. Dispensing systems involving chambers or traps at the tops of the containers were subsequently developed and these were exemplified by U.S. Pat. Nos. 2,591,455 and 3,089,623.

More recent United States patents describe measuring and dispensing caps which involve squeeze bottles and/or pump mechanisms for dispensing of liquid and semi-liquid materials. Thus, U.S. Pat. Nos. 4,077,547, 4,364,492, 4,376,495 and 4,518,105 describe various types of dispensing systems using trap chambers with squeezable bottles and/or pump mechanisms.

U.S. Pat. No. 4,875,603 describes a metered chamber mechanism with a cap that is removable. The meter chamber fills up when the cap is screwed onto a meter element. When the cap is removed, the user pushes downward on a gripping protrusion located on the meter element which forces the material out of an opening in the meter element.

Notwithstanding formidable prior art in the metered dispensing field, none of the prior art systems describe a simple metered mechanism, such as is described in the present invention, whereby squeezing a container and pressing down on a manifold cover, without removing any part of the present invention, will result in a simple metered, uniform dispensing of a material.

SUMMARY OF THE INVENTION

The present invention is directed to a metered dispensing cap with manifold cover for containers such as tubes and the like. The metered dispensing cap with manifold cover has a base element, a meter element housing a one-way valve, a manifold cover and a open-close valve. The base element is attachable to a neck of a squeezable container and has a lock portion forming an opening sized and shaped for housing the meter element. The lock portion has connecting means for connecting the lock portion to the neck of the squeezable container.

The one-way valve is located in an opening in a bottom portion of the meter element and extends into the squeezable container. It allows for dispensing of material into a meter chamber and also prevents backflow of material into the container. When the manifold cover is pressed down against a recipient surface, the open-close valve opens and permits flow of material from the meter chamber through a manifold chamber and onto the recipient surface through a top of the manifold cover. When the manifold cover is released, the open-close valve closes, which positions the device for refilling into the meter chamber.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

The present invention relates to an easy-to-use metered dispensing cap with manifold cover device for tubes and other types of containers. The device permits the user to squeeze a container and cause a meter chamber to be filled. The device is used for metered dispensing of deodorant, shampoo, laundry detergent or the like and may be made from a plastic.

When a manifold cover is pressed against a recipient surface, material from a meter chamber flows into a manifold chamber and out through a top of the manifold cover. When the manifold cover is released from the surface, material no longer flows into the manifold chamber.

Two open-close valves cause the material to flow or be restricted. The one-way valve, which is located in an opening in a bottom of a meter element, allows the material from the container to flow into the meter chamber when the container is squeezed. The open-close valve, which is located in an opening at a top of the meter chamber, opens when the manifold cover is pressed down. Both valves open and close inversely.

Figure 1:
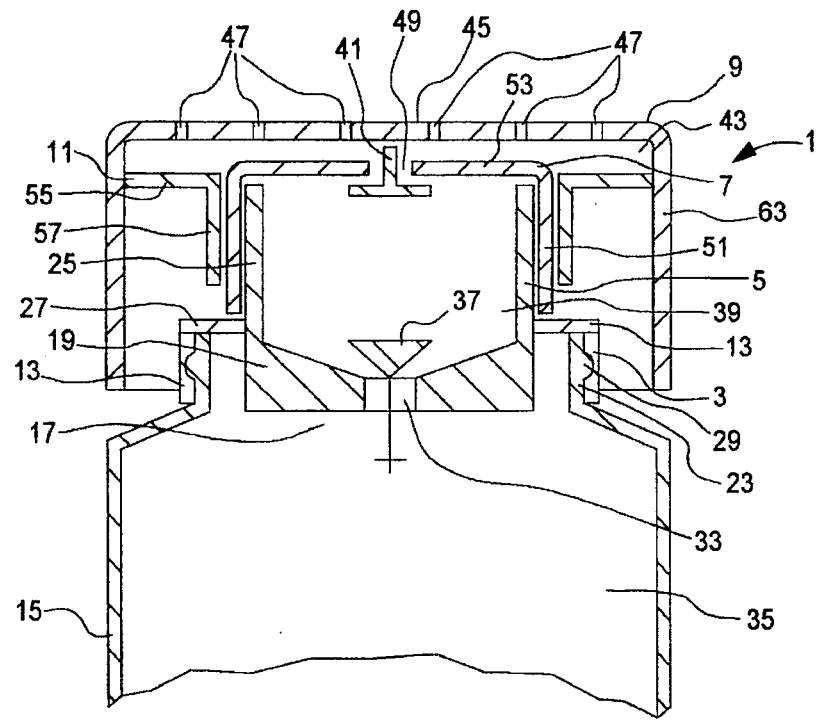
FIG. 1 illustrates a side, cut view of a metered dispensing cap with manifold cover in a neutral position before a container has been squeezed.
Figure 2:
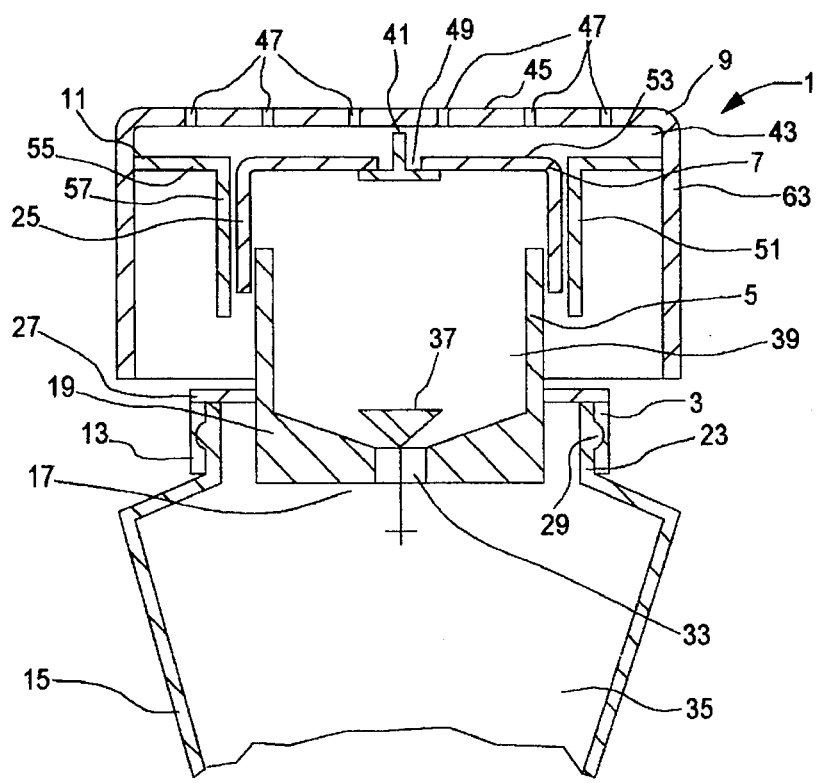
FIG. 2 illustrates a side, cut view of a metered dispensing cap with manifold cover after a container has been squeezed.
Figure 3:
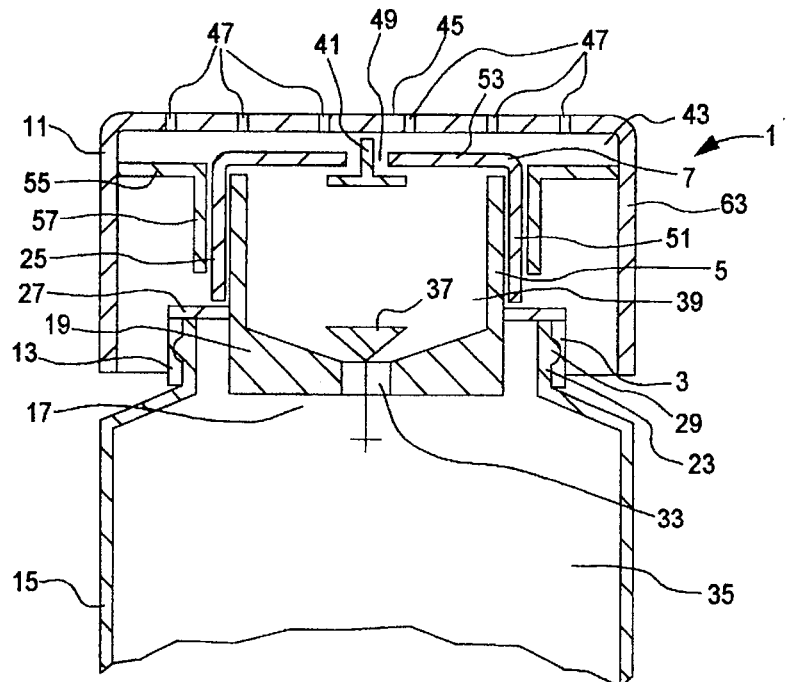
FIG. 3 illustrates a side, cut view of a metered dispensing cap with manifold cover after a container has been squeezed and a manifold cover pushed downward.

Referring now to the drawings, FIGS. 1, 2 and 3 show a side, cut view of a metered dispensing cap 1 with manifold cover 9 in different stages of dispensing a material 35 such as an underarm deodorant. The metered dispensing cap 1 with manifold cover 9 includes a base element 3, a meter element 5 surrounded on an upper portion by a valve guard 7 housing a first one-way valve 37, a manifold cover 9 with a reinforcement element 11 and a open-close valve 41.

The base element 3 includes a stop 27 for stopping movement when the manifold cover 9 is pressed downward and a lock portion 13 which is removeably attached to a container 15. The container 15 has an opening 17 which houses a bottom portion 19 of a meter element 5. The lock portion 13 includes threads 23 and the container 15 includes threads 29, which interlock the base element 3 with the container 15.

The meter element 5, which is attached to the base element 3, includes a sidewall portion 25, and the bottom portion 19. The bottom portion 19 contains an opening 33 for outflow of the material 35 from the container 15. Located in the opening 33 is the one-way valve 37 which permits a flow of material 35 from the container 15 to a meter chamber 39 located in an inner portion of the meter element 5, when the container 15 is squeezed. The one-way valve 37 can be a one-way plunger valve.

The manifold cover 9 includes a sidewall portion 63 and a top 45 having at least one hole 47 for dispensing the material 35 from a manifold chamber 43, which is located below the top 45 of the manifold cover 9, onto a skin or some other recipient surface. In this embodiment, the manifold cover 9 is rectangular.

The valve guard 7 includes an opening 49, a sidewall portion 51, and a top 53 and is attached to the sidewall portion 25 of the meter element 5. The valve guard 7 permits flow of the material 35 from the meter chamber 39 into the manifold chamber 43. The open-close valve 41 is located in an opening 49 in the valve guard 7 and depends from the top 45 of the manifold cover 9. Between the valve guard 7 and the top 45 of the manifold cover 9 is a spring 59 which causes the open-close valve 41 to stay closed except when the manifold cover 9 is pressed down. The spring 59 is biased in an upward position for the open-close valve 41 and may be a plastic spider spring.

The reinforcement element 11 includes a first member 55 and a second member 57 being approximately perpendicular. The first member 55 is integrally attached to the sidewall portion 63 of the manifold cover 9. The second member 57 is slideably attached to the sidewall portion 51 of the valve guard 7.

As shown in FIG. 2, when the container 15 is squeezed the one-way valve 37 opens and allows material in the container 15 to enter into the meter chamber 39, thereby pushing up and expanding the volume of the material 35 in the meter chamber 39 until the meter chamber 39 is completely filled with a metered amount of dispensed material 35. The open-close valve 41 remains closed because of the action of the spring 59.

As shown in FIG. 3, when the manifold cover 9 is pushed down, the spring 59 is depressed, thereby opening the open-close valve 41. The dispensed material 35 from the meter chamber 39 then enters the manifold chamber 43 for uniform outflow through the at least one hole 47 in the top 45 of the manifold cover 9. At the same time, the one-way valve 37 is pushed downward, thus preventing flow of material 35 back into the container 15.

Initially, the metered dispensing cap 1 with manifold cover 9 would contain all the material 35 in the container 15 and the one-way valve 37 and would be in a neutral position and the open-close valve 41 would be in a closed position, as shown in FIG. 1. The user would then squeeze the container 15 or otherwise push the material 35 through the container 15 and open the one-way valve 37. The volume of the material 35 in the meter chamber 39 would thereby be expanded until the material 35 has slid up to a top 53 of the valve guard 7.

At this point, the one-way valve 37 is open and the open-close valve 41 is closed, as shown in FIG. 2. The user would then press the top 45 of the manifold cover 9 down against skin, or another recipient surface. The pressing down motion causes the manifold cover 9 to move down towards the base element 3, the motion being stopped by the reinforcement element 11 meeting the stop 27.

When the manifold cover 9 moves down, the open-close valve 41 opens and the one-way valve 37 closes, thereby causing the material 35 to flow into the manifold chamber 43 from the meter chamber 39 and out through the at least one hole 47. The only amount of material 35 that flows out of the at least one hole 47 is material 35 in the meter chamber 39 since the one-way valve 37 closes when the open-close valve 41 opens. At the same time, none of the material 35 can backflow into the container 15. The flow out of the plurality of holes 47 is a metered, even flow.

Figure 4:
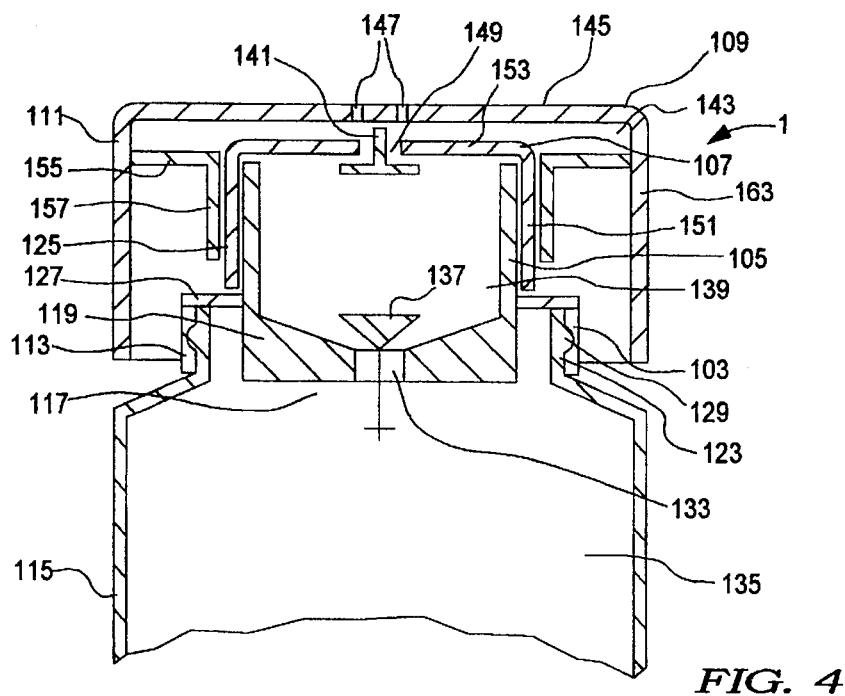
FIG. 4 illustrates a side, cut view of a an alternate embodiment of a metered dispensing cap with manifold cover in a neutral position before a container has been squeezed.

FIG. 4 shows an alternative embodiment of the present invention. In this embodiment, there is one exit hole 149 in each direction and the manifold cover 109 is round. This embodiment represents material 135 such as shampoo. Like parts to those parts in FIG. 1 are numbered in increments of 100.

Figure 5:
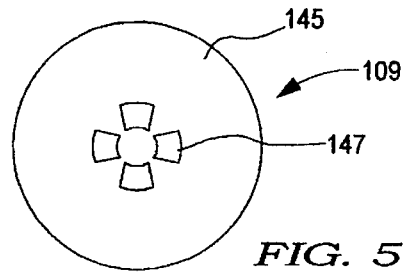
FIG. 5 shows a top view of the metered dispensing cap with manifold cover shown in FIG.

FIG. 5 shows a top view of the metered dispensing cap 1 with manifold cover 9 shown in FIG. 4. There is shown the top 145 of the manifold cover 109 having one exit hole 147 in each direction on a side of the top 145 of the manifold cover 109. The one exit hole 147 provides for a glob of material to be dispensed.

Obviously, numerous modifications and variations of the present invention are possible in light of the above teachings. It is therefore understood that within the scope of the appended claims, the invention may be practiced otherwise than as specifically described herein.

What is claimed is:

1. A metered dispensing cap with manifold cover device for a squeezable container, which comprises:

(a) a base element, attachable to a neck of a squeezable container, and having a lock portion forming an opening sized and shaped for housing a meter element, and a stop for stopping movement of a manifold cover when said manifold cover is pressed downward against a recipient surface, said lock portion including a connecting means for removably connecting said base element to said neck of said squeezable container;

(b) a meter element attached to said base element and having an opening in a bottom portion, said opening housing a one-way valve for dispensing of material from said squeezable container into a meter chamber located in an inner portion of said meter element, said one-way valve preventing backflow of said material into said squeezable container;

(c) said manifold cover including a top for outflow of said material and a reinforcement support, said reinforcement support having a first member approximately perpendicular to a second member, said second member being slidably attached to a sidewall of a valve guard surrounding an upper portion of said meter element; and (d) a open-close valve depending from said top of said manifold cover and permitting flow of said material from said meter chamber to a manifold chamber located below said top of said manifold cover wherein when said manifold cover is pressed downward said open-close valve opens allowing said material to flow from said meter chamber through said manifold chamber and onto said recipient surface through said top of said manifold cover and wherein when said manifold cover is released, said open close valve closes whereby said device is repositioned for refilling of said meter chamber.

2. The device of claim 1 which further comprises a squeezable container having a neck sized and shaped for housing said meter element.

3. The device of claim 2 wherein said connecting means of said lock portion includes threads for interlocking said base element with said neck of said squeezable container.

4. The device of claim 3 wherein said squeezable container includes threads for interlocking said neck of said squeezable container to said base element.

5. The device of claim 4 wherein said one-way valve is a plunger valve.

6. The device of claim 5 wherein said valve guard has an opening for housing said open-close valve.

7. The device of claim 6 wherein said stop is approximately perpendicular to said lock portion.

8. The device of claim 7 wherein said manifold cover has at least one hole for permitting flow of material from said manifold chamber through said at least one hole.

9. The device of claim 8 wherein a spring is positioned between said top of said manifold cover and said valve guard.

10. The device of claim 9 wherein said downward pressing of said manifold cover is stopped by a meeting of said reinforcement support with said stop.

11. The device of claim 10 wherein said one-way valve and said open-close valve open and close inversely.

12. The device of claim 11 wherein said meter element further includes a sidewall portion.

13. The device of claim 12 wherein said meter chamber has a predetermined volume for receiving said material from said squeezable container.

14. The device of claim 13 wherein said manifold cover has a rounded top.

15. The device of claim 14 wherein said sidewall portion of said meter element has a cylindrical cross-sectional shape.

16. The device of claim 15 wherein said device is entirely constructed of plastic materials.

17. The device of claim 16 wherein a flow of said material through said at least one hole is uniform.

18. The device of claim 17 wherein said material already squeezed into said meter chamber is the only material which flows into said manifold chamber after said manifold cover is pressed down.

* * * * *